H. W. WYMAN.
Ice-Cream Carriers.

No. 168,203. Patented Sept. 28, 1875.

WITNESSES:
A. W. Almqvist
Alex F. Roberts

INVENTOR:
H. W. Wyman
BY
Munn & Co.
ATTORNEYS.

UNITED STATES PATENT OFFICE.

HENRY W. WYMAN, OF NEW YORK, N. Y.

IMPROVEMENT IN ICE-CREAM CARRIERS.

Specification forming part of Letters Patent No. 168,203, dated September 28, 1875; application filed September 11, 1875.

*To all whom it may concern:*

Figure 1:
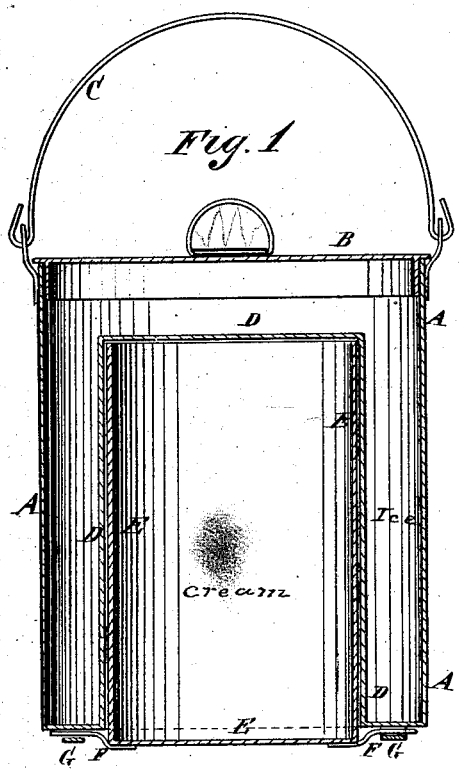
Figure 2:
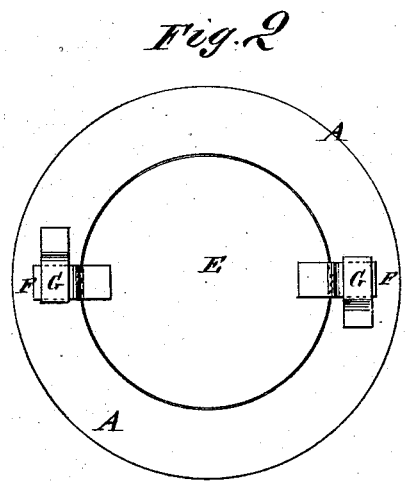

Be it known that I, HENRY W. WYMAN, of the city, county, and State of New York, have invented a new and Improved Ice-Cream Carrier, of which the following is a specification:

Figure 1 is a vertical longitudinal section of my improved carrier, and Fig. 2 is a bottom view of the same.

Similar letters of reference indicate corresponding parts.

The object of this invention is to furnish an improved vessel for carrying ice-cream in small or large quantity from the saloon or place of manufacture to the place where it is to be eaten, without its melting, and which shall be simple in construction and convenient in use.

The invention consists in the combination of the outer vessel, provided with a cover and bail, the inner vessel, made with an open bottom and a closed top, the detachable vessel, and the lugs and open keepers, or equivalent fastenings, with each other, as hereinafter fully described.

A is a vessel similar in shape to an ordinary tin pail, and of any desired or convenient size. The vessel A is provided with a closely-fitting cover, B, and with a bail, C, for convenience in carrying it. In the bottom of the vessel A is formed a hole, in which is secured the bottom edge of a vessel, D. The vessel D is concentric with the vessel A, and is made with an open bottom and a closed top, and not quite so high as the vessel A, so that there may be a space all around between the sides of the vessel A and D, and between the top of the vessel D and the covers B, to receive ice to keep the contents of the vessel D cool. E is a vessel fitting into the vessel D, and having projecting lugs F attached to the opposite sides of its bottom, which may be turned into open keepers G, attached to the ring bottom of the vessel A, to lock the vessel E into the vessel D. Spring-catches or other convenient fastenings may be used to secure the vessel E in place. The vessel E may be provided with a cover, or it may be made of such a height that its upper edge may rest against the top of vessel D.

The vessel E is designed to receive ice-cream, milk, or other substance to be carried, and which requires to be kept cool. A number of these devices may be kept at saloons, and sent to customers with ice-cream ordered; or they may be kept by the customers and sent to the saloons, with their orders, to receive the ice-cream ordered.

Having thus described my invention, I claim as new and desire to secure by Letters Patent—

The combination of the vessel A, provided with a cover, B, and bail C, the inner vessel D, made with an open bottom and a closed top, the detachable vessel E, and the lugs and open keepers F G, with each other, substantially as herein shown and described.

HENRY W. WYMAN.

Witnesses:
JAMES T. GRAHAM,
JAMES H. HUNTER.